(12) United States Patent
Watanabe et al.

(10) Patent No.: US 7,149,602 B2
(45) Date of Patent: Dec. 12, 2006

(54) CORRECTION DATA CHECKING SYSTEM FOR REBOTS

(75) Inventors: Atsushi Watanabe, Tokyo (JP); Mitsuhiro Okuda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 36 days.

(21) Appl. No.: 10/954,606

(22) Filed: Oct. 1, 2004

(65) Prior Publication Data

US 2005/0107918 A1    May 19, 2005

(30) Foreign Application Priority Data

Oct. 2, 2003    (JP)    ............................. 2003-344224

(51) Int. Cl.
*G06F 19/00* (2006.01)

(52) U.S. Cl. ........................ 700/245; 700/186; 700/264

(58) Field of Classification Search ................ 700/245, 700/186, 264
See application file for complete search history.

(56) References Cited

U.S. PATENT DOCUMENTS

| | | | | |
|---|---|---|---|---|
| 4,595,989 | A * | 6/1986 | Yasukawa et al. | 700/254 |
| 4,831,316 | A * | 5/1989 | Ishiguro et al. | 700/254 |
| 5,555,347 | A * | 9/1996 | Yoneda et al. | 700/247 |
| 5,961,858 | A * | 10/1999 | Britnell | 219/121.63 |
| 5,987,591 | A * | 11/1999 | Jyumonji | 700/259 |
| 6,021,361 | A * | 2/2000 | Taninaga et al. | 700/182 |
| 6,167,328 | A * | 12/2000 | Takaoka et al. | 700/264 |
| 6,452,131 | B1 * | 9/2002 | Britnell | 219/121.6 |
| 2005/0065653 | A1 * | 3/2005 | Ban et al. | 700/245 |

FOREIGN PATENT DOCUMENTS

| | | | |
|---|---|---|---|
| JP | 63-0804777 | * | 4/1988 |
| JP | 01-197069 | * | 8/1989 |
| JP | 03-055194 | * | 3/1991 |
| JP | 05-011830 | | 5/1993 |
| JP | 09-314349 | * | 12/1997 |
| JP | 63-313206 | | 12/1998 |
| JP | 2004-074224 | * | 3/2004 |

* cited by examiner

*Primary Examiner*—Thomas G. Black
*Assistant Examiner*—McDieunel Marc
(74) *Attorney, Agent, or Firm*—Drinker Biddle & Reath LLP

(57) ABSTRACT

Provided is a correction data checking system, for robots, which makes it easy to reveal the cause of a machining defect. A laser machining head and a distance sensor or a sensor for detecting a work line are attached to the distal end of a robot arm. A robot is driven based on a teaching program, and a copying control technique is implemented based on information sent from the sensor so that the distance between the laser machining head and a workpiece will be equal to a set value. A path of taught positions of the laser machining head and a path of actual positions thereof are displayed in comparison with each other on a display of a teaching console or the like. Moreover, the difference between the taught position and actual position is calculated and displayed. As both the position commanded by the teaching program and the actual position derived from the copying control technique are displayed, if a machining defect occurs, the machining defect is checked to see if it is a problem attributable to the sensor or a problem attributable to the workpiece or a jig. The cause of the machining defect is then revealed. Consequently, the cause of a machining defect can be quickly revealed and dealt with at a working site.

7 Claims, 10 Drawing Sheets

CORRECTION DATA CHECKING SYSTEM FOR REBOTS

BACKGROUND OF THE INVENTION

1. Field of the Invention

The present invention relates broadly to a robot and, in particular, is concerned with a correction data checking system for robots that perform work while correcting a path, which is commanded by a teaching program, using a sensor.

2. Description of the Related Art

In recent years, the number of fields in which robots are utilized has increased with the advent of more intelligent industrial robots. One of the uses of an intelligent industrial robot is a use based on a copying control technique according to which a height sensor for detecting a distance or a sensor for detecting the position of a work line on a workpiece using a laser light projector and a camera is employed in a robot in order to correct the motion of the robot, which is usually done based on a playback control technique, in line with the shape of the workpiece, that is, an object of the work.

Regarding a copying control technique for controlling the motion of a robot, a teaching aid system permitting checking of correction data produced through the copying control is already known.

As mentioned above, a system permitting checking of correction data produced according to the copying control technique that utilizes a sensor is known as a teaching aid system for robot systems employing a sensor. However, a system making it possible to compare taught reference teaching data with actual data in the course of manufacture, in practice, is still unavailable. Therefore, if a machining defect occurs, although correction data produced through the copying control can be checked, it is hard to determine the cause of the machining defect, after checking the machining defect, to see if it is a problem attributable to a sensor or a problem attributable to a workpiece or a jig.

SUMMARY OF THE INVENTION

Accordingly, an object of the present invention is to provide a correction data checking system for robots making it possible to check a defect to see if it is a problem attributable to a sensor or a problem attributable to a workpiece or a jig, and then reveal the cause of the defect readily.

The present invention provides a correction data checking system for robots that include a sensor for detecting the position of a work line on a workpiece or a sensor for measuring the distance to the workpiece, and a working tool being moved relative to the workpiece according to the copying control technique. The correction data checking system for robots comprises: a path position-of-movement calculation unit that checks a path position of movement commanded by a teaching program; an actual position-of-movement calculation unit that calculates an actual position of movement, to which the working tool is moved by implementing the copying control technique, according to the teaching program; and a comparison display unit that displays the actual position of movement and the associated path position of movement in comparison with each other.

A path position of movement and an actual position of movement are calculated for each position taught by a teaching program.

Moreover, the correction data checking system comprises a memory unit in which path positions of movement calculated at a plurality of predetermined timings are stored. The comparison display unit displays the actual positions of movement and the path positions of movement which are stored in the memory unit in association with the actual position of movement, in comparison with each other.

Moreover, the correction data checking system comprises a device for externally indicating the actual position of movement and the path position of movement.

According to another aspect of the present invention, there is provided a correction data checking system for robots that include a sensor for detecting the position of a work line on a workpiece or a sensor for measuring the distance to the workpiece, and a working tool to be moved to the workpiece according to the copying control technique. The correction data checking system for robots comprises: a path position-of-movement calculation unit that calculates a path position of movement by simulating a teaching program; an actual position-of-movement calculation unit for calculating an actual position of movement, to which the working tool is moved by implementing the copying control technique, according to the teaching program; and a comparison display unit that displays the simulated path position of movement and the actual position of movement in comparison with each other.

According to still another aspect of the present invention, there is provided a correction data checking system for robots using a sensor which detects the position of a work line on a workpiece or a sensor which measures the distance to the workpiece to work on the workpiece while moving a working tool to the workpiece according to the copying control technique, and the robot controlling or modifying conditions for machining according to information which is sent from the sensor and dependent on the state of the workpiece. The correction data checking system comprises: a memory unit in which the conditions for machining commanded for the working tool by a teaching program are acquired and stored at a plurality of predetermined timings; an actual conditions-for-machining calculation unit that calculates actual conditions for machining, under which the working tool are controlled, according to the teaching program; and a comparison display unit that displays the actual conditions for machining and the conditions for machining stored in the memory in comparison with each other.

The correction data checking system further comprises an external display unit on which the actual conditions for machining and the conditions for machining are displayed.

In any of the foregoing correction data checking systems, the working tool is held stationary and the workpiece is moved according to the copying control technique by employing a sensor that detects the position of a work line on the workpiece or a sensor that measures the distance to the workpiece.

BRIEF DESCRIPTION OF THE DRAWINGS

The above and other objects, features and advantages of the present invention will be made more apparent, from the following description of the preferred embodiments thereof, with reference to the accompanying drawings wherein:

FIG. 9a is an explanatory diagram schematically showing an applied example of the present invention;

FIG. 9b is an enlarged diagram of part of the applied example shown in FIG. 9a.

DESCRIPTION OF THE PREFERRED EMBODIMENTS

Figure 1:
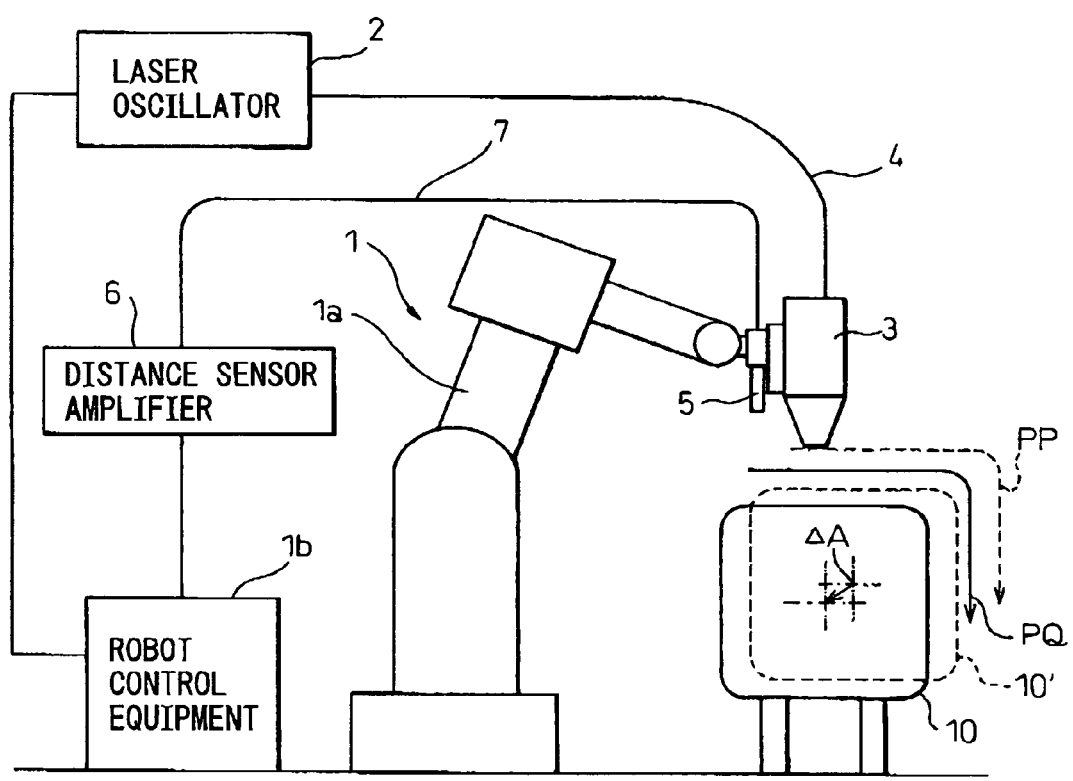
FIG. 1 schematically shows the hardware configuration of a robot system that uses a robot, to which a correction data checking system in accordance with the present invention can be adapted, to machine a workpiece with laser light.

FIG. 1 schematically shows a robot system to which a correction data checking system in accordance with the present invention can be adapted. The robot system uses a robot 1 to machine a workpiece 10, which is an object to be machined, with laser light. A laser machining head 3 that is a work tool is attached to the distal end of a robot arm included in a robot mechanism 1a. The laser machining head 3 and a laser oscillator 2 are linked by an optical fiber 4.

Moreover, a distance sensor 5 is attached together with the laser machining head 3 to the distal end of the robot arm included in the robot mechanism 1a. An output of the distance sensor 5 is transferred to a distance sensor amplifier 6 over a cable 7. An output of the distance sensor amplifier 6 is transferred to a robot control equipment 1b.

Figure 2:
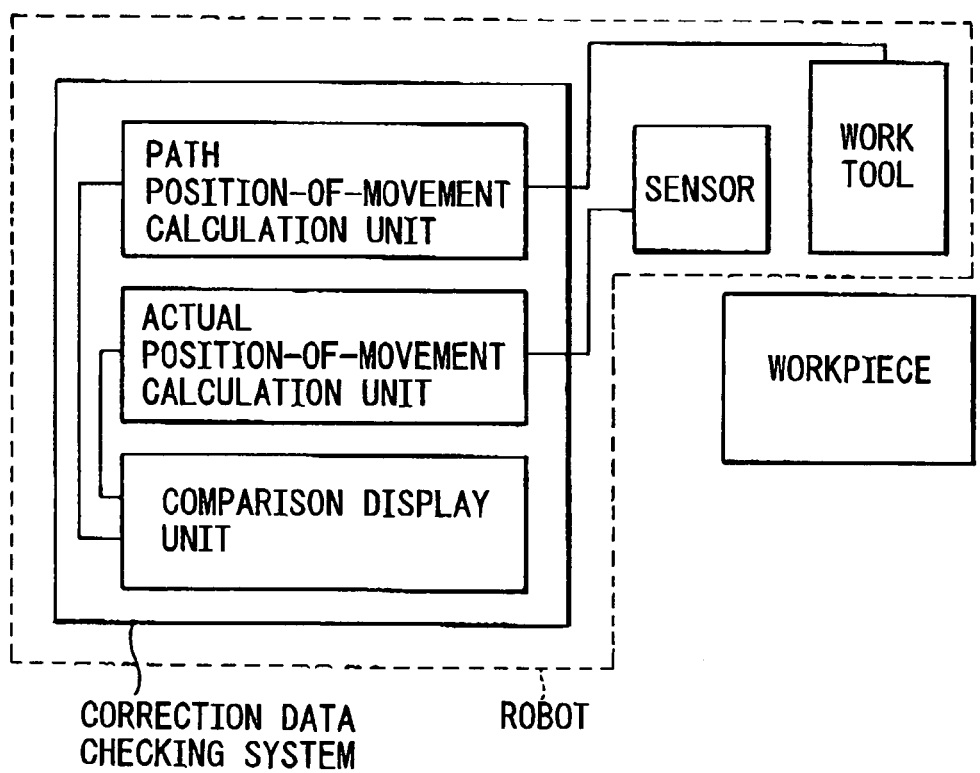
FIG. 2 is a block diagram showing the fundamental configuration of the correction data checking system in accordance with the present invention.

FIG. 2 is a block diagram showing the fundamental configuration of a correction data checking system in accordance with the present invention. The correction data checking system for robots that include a sensor for detecting the position of a work line on a workpiece or a sensor for measuring the distance to the workpiece and a work took to be moved to the workpiece according to the copying control technique comprises: a path position-of-movement calculation unit that calculates a path position of movement commanded by a teaching program; an actual position-of-movement calculation unit that calculates an actual position of movement, to which the work tool is moved by implementing the copying control technique, according to the teaching program; and a comparison display unit that obtains the path position of movement associated with the actual position of movement, and displays the positions in comparison with each other.

Figure 3:
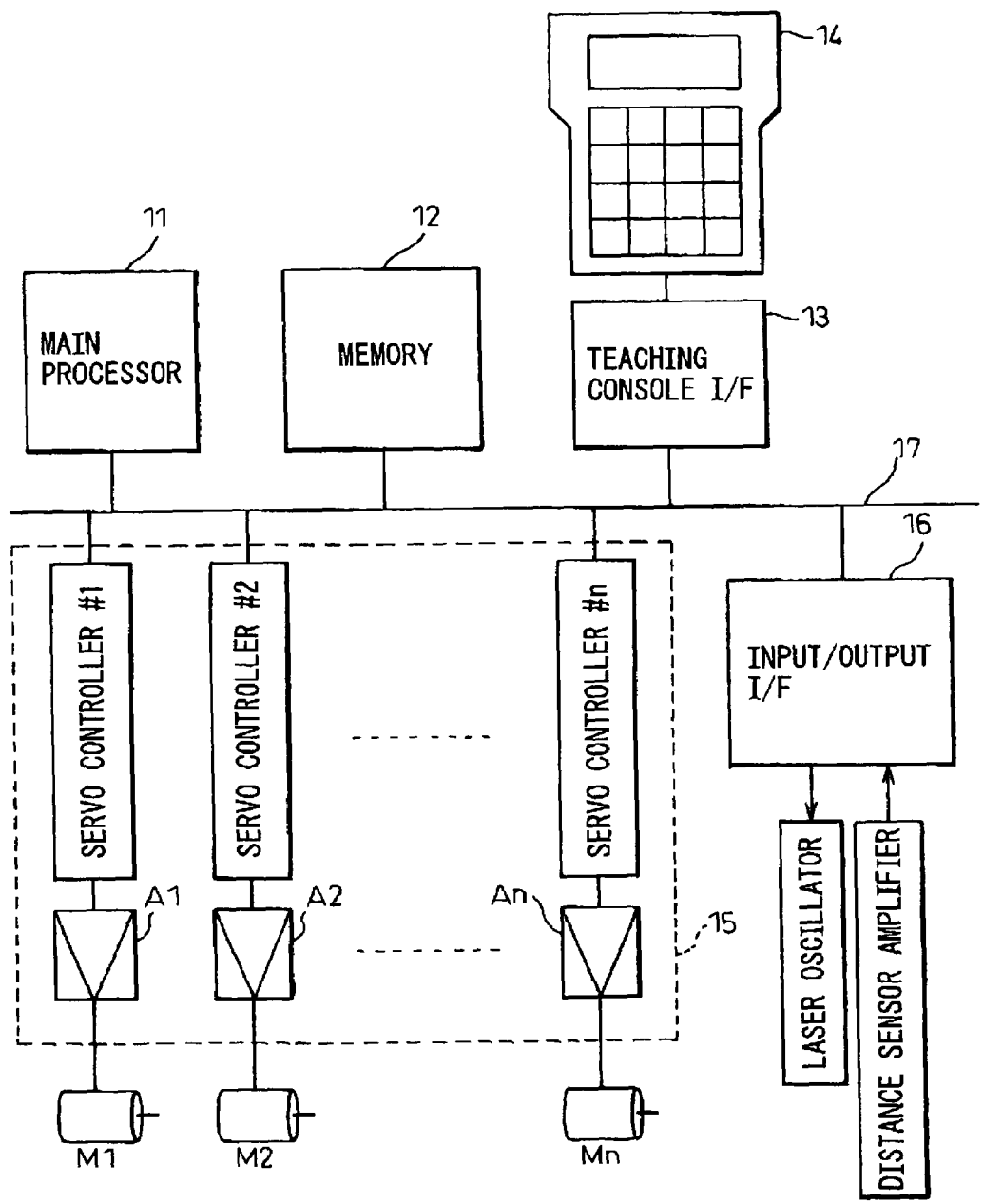
FIG. 3 is a block diagram showing a major portion of robot control equipment that realizes the correction data checking system in accordance with the present invention.

FIG. 3 is a block diagram showing a major portion of the robot control equipment 1b that realizes the correction data checking system in accordance with the present invention. A main processor 11 realizing the path position-of-movement calculation unit and the actual position-of-movement calculation unit, a memory 12 composed of a RAM, a ROM, and a nonvolatile memory (EEPROM or the like), a teaching console interface 13, an input/output interface 16, and a servo control unit 15 are interconnected on a bus 17. Moreover, a teaching console 14 including the comparison display unit is connected to the teaching console interface 13.

System programs supporting the fundamental facilities included in the robot and robot control equipment alike are stored in the ROM included in the memory 12. A motion program for teaching the robot a motion according to a purpose of use and relevant setting data are stored in the nonvolatile memory of the memory 12. The RAM of the memory 12 is used as a temporary storage area in which data is temporarily stored during various arithmetic operations to be performed by the processor 11.

The servo control unit 15 comprises servo controllers #1 to #n (where n denotes the sum total of shafts included in the robot to which, if necessary, the number of movable shafts of tools to be attached to the wrists of the robot is added). Each of the servo controllers #1 to #n include a processor, ROM, and RAM, and each perform loop control on the position or speed of a servomotor that drives an associated robot shaft or also performs loop control on a current flowing through it. Specifically, the servo control unit 15 comprises so-called digital servo controllers that perform loop control on the position, speed, or current by software. The outputs of the servo controllers #1 to #n are used to drive and control respective shaft servomotors M1 to Mn after being amplified by respective servoamplifiers A1 to An. Each of the servomotors M1 to Mn includes a position/speed detector. The positions and speeds of the servomotors detected by the position/speed detectors are fed back to the respective servo controllers #1 to #n. Moreover, the sensors incorporated in the robot as well as actuators and sensors incorporated in peripheral equipment are connected to the input/output interface 16. More particularly, in the present embodiment, the laser oscillator 2 and distance sensor amplifier 6 are connected to the input/output interface 16.

The foregoing components of the robot control equipment may be identical to those included in conventional robot control equipment. The present invention is characterized in that the robot control equipment is used to configure a correction data checking system capable of checking a path position of movement commanded by a teaching program and an actual position of movement, to which a movement is made by correcting a position commanded by the teaching program according to correction data produced by implementing the copying control technique using the distance sensor 5, in comparison with each other.

A program describing a path of machining taught by designating teaching points that constitute the path of machining is stored in the memory 12 of the robot control equipment 1b. The processor 11 included in the robot control equipment 1b runs the teaching program, and propagates a laser beam produced by the laser oscillator 2 to the laser machining head 3 over the optical fiber 4. The laser beam is irradiated from the laser machining head 3 to the workpiece 10. Moreover, the processor 11 instructs the servo controllers #1 to #n according to the teaching program so that the servomotors M1 to Mn associated with the respective robot shafts are driven and controlled in order to drive the robot mechanism 1a. The laser machining head 3 attached to the distal end of the robot arm included in the robot mechanism 1a is moved along the path of machining commanded by the teaching program, whereby the workpiece is machined with laser light. At this time, the robot control equipment 1b uses the distance sensor 5 to measure the distance or gap between the distal end of a nozzle of the laser machining head 3 and the workpiece 10. The robot control equipment 1b then calculates a correction value for making the height position of the laser machining head 3 consistent with the path commanded by the teaching program, and corrects the height position of the laser machining head 3 by a magnitude equivalent to the correction value so that the measured distance will be agreed with a reference gap value. Thus, the copying control technique is implemented in driving or control of the robot mechanism 1a.

For example, the teaching program shall be described on the assumption that the workpiece 10 has a shape indicated with a dashed line in FIG. 1. At this time, a path of machining along which the laser machining head 3 is moved for machining shall be indicated with a dashed line PP in FIG. 1. Moreover, the workpiece 10, manufactured as an article included in a certain lot, shall be deformed by a magnitude ΔA and shaped as indicated with a solid line. In this case, correction data is produced based on a distance measured by the distance sensor 5. A position PP in a path of movement commanded by the teaching program is corrected according to the shape of the workpiece 10. Consequently, an actual path of machining is corrected into a path indicated with a solid line PQ. Eventually, the distance or gap between the workpiece 10 and the nozzle of the laser machining head 3 is retained at the predetermined gap length.

The foregoing copying control technique employing the distance sensor 5 has been adopted in the past. According to the present embodiment, the copying control technique is utilized so that a path position of movement commanded by the teaching program and an actual position of movement can be checked in comparison with each other.

Figure 4:
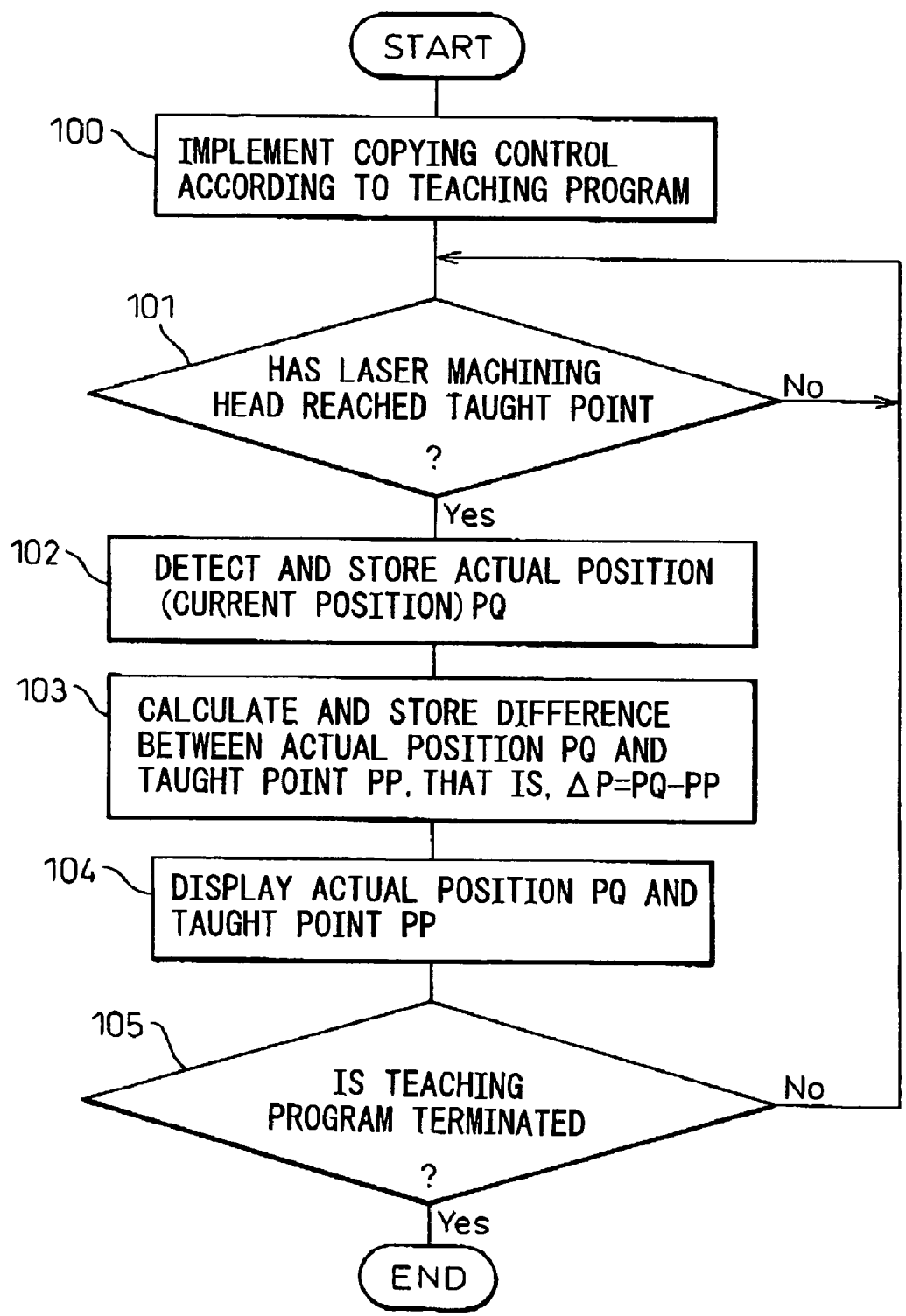
FIG. 4 is a flowchart describing actions to be performed in a correction data checking system in accordance with a first embodiment of the present invention.

FIG. 4 is a flowchart describing actions to be performed in a correction data checking system in accordance with a first embodiment that is realized by the robot control equipment 1b.

The processor 11 included in the robot control equipment 1b invokes a teaching program so as to implement the copying control technique according to the teaching program (step 100). At step 100, the processor 11 distributes a move command to the servo controllers #1 to #n included in the servo control unit 15 so as to drive the robot mechanism 1a. At this time, the processor 11 checks the distance from the distal end of the nozzle of the laser machining head to the workpiece 10, which is fed back from the distance sensor 5, and implements the feedback control technique so that the distance will be agreed with a set gap length. The robot mechanism 1a is thus driven. The laser machining head is checked to see if it has reached a taught point (step 101). If the laser machining head has reached the taught point, the actual position of the laser machining head, that is, the current position PQ thereof, is read and stored (step 102). Moreover, the difference ΔP between the actual position PQ and the position PP of the taught point is calculated and stored in association with the taught point (step 103). Furthermore, the actual position PQ and the position PP of the taught point are displayed on the display of the teaching console 14 (step 104). At step 104, the actual positions PQ and the positions PP of the taught points that are successively displayed are sequentially linked by straight lines. For the display, the display form such as a display color should preferably be different between the actual positions PQ and the positions PP of the taught points. The above process is repeated until the teaching program is terminated (step 105).

Consequently, on the display of the teaching console 14, the path positions PP of movement commanded by the teaching program are displayed while being linked by a straight line, and the actual positions PQ associated with the taught positions are displayed while being linked by a straight line. The comparison of the positions PP with the positions PQ can be achieved easily. When a certain taught point is selected, the stored difference ΔP of the taught point from an associated actual position is indicated in the form of a numerical value. This makes it possible to check the difference ΔP between any required path position PP of movement commanded by the teaching program and the associated actual position PQ. In other words, the workpiece 10 and/or a jig can be checked to see if it has made a displacement or deformation. Moreover, if a machining defect occurs, the machining defect can be checked to see if it is a problem attributable to the distance sensor 5 or a problem attributable to the workpiece 10 or a jig. Thus, the cause of the machining defect can be revealed readily.

Figure 5:
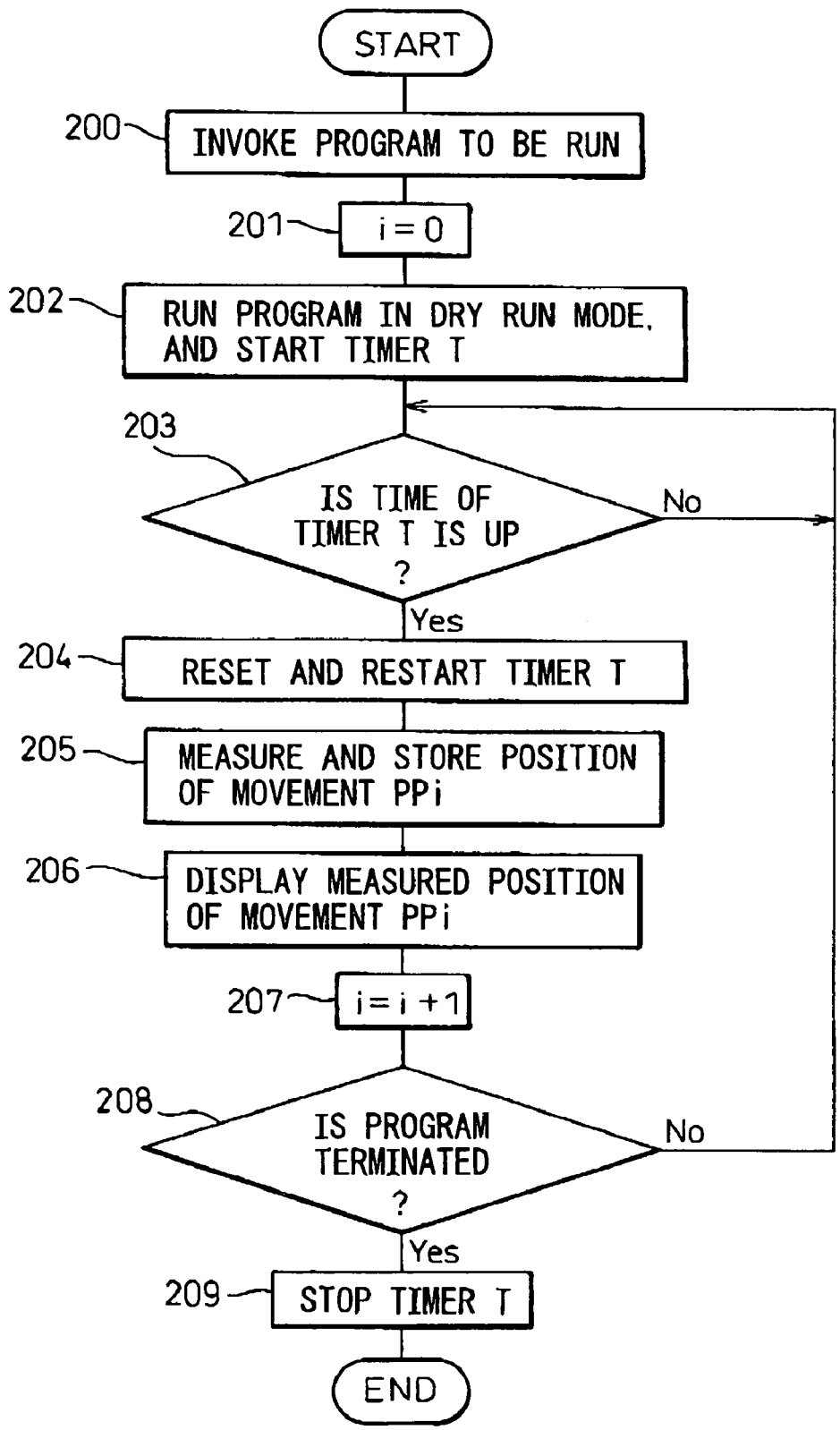
FIG. 5 is a flowchart describing actions to be performed for a dry run in a correction data checking system in accordance with a second embodiment of the present invention.
Figure 6:
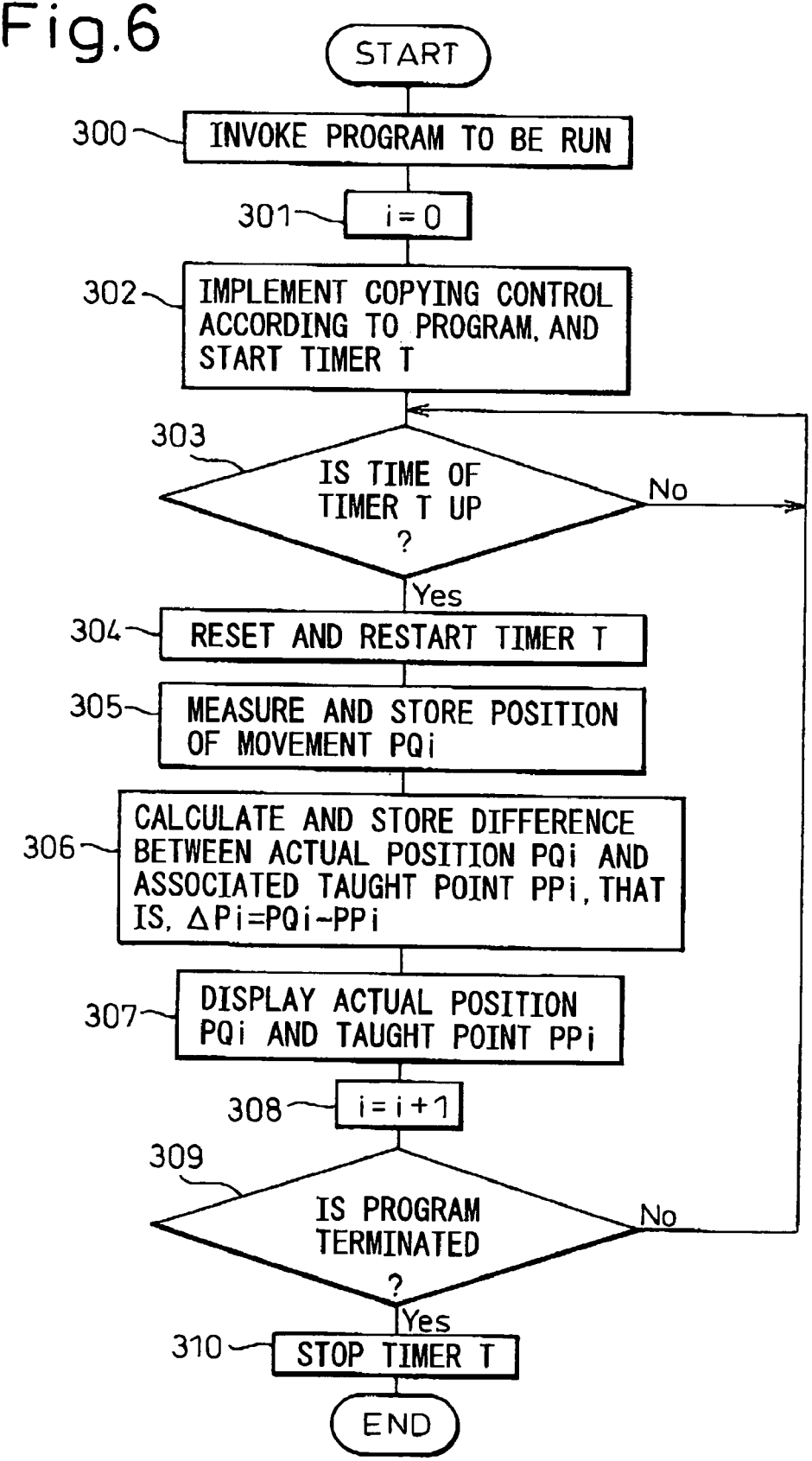
FIG. 6 is a flowchart describing actions to be performed for actual machining in the correction data checking system in accordance with the second embodiment.

FIGS. 5 and 6 are flowcharts describing actions to be performed in a second embodiment of the present invention. According to the second embodiment, first, a teaching program is run in a dry run mode (in which neither actual machining is performed nor the copying control technique is implemented but the teaching program is merely run) in order to drive the robot. The path position PP of movement to which the robot is moved is recorded at intervals of a predetermined time. Thereafter, the teaching program is actually run, and the copying technique is implemented in order to drive the robot. The actual position PQ is measured and stored at interval of the predetermined set time, and the difference ΔP between the path position PP of movement attained during the dry run and the actual position PQ is calculated. The positions PP and PQ are displayed so that they can be checked in comparison with each other.

FIG. 5 is a flowchart describing a process of driving the robot in the dry run mode and acquiring data of a path position of movement commanded by a teaching program.

First, the processor 11 invokes a teaching program to be run (step 200). Thereafter, an index i indicating acquired data of a path position of movement is reset to zero (step 201). The teaching program is run in a dry run mode, and a timer T is started to count down a preset time interval during which position data is acquired (step 202). The processor 11 does not implement the copying control technique but runs the teaching program in the dry run mode so as to drive the robot mechanism 1a. The timer T is then checked to see if it has finished counting down the preset time, that is, the preset time is up (step 203). If the preset time is up, the timer T is restarted to count down the preset time (step 204). The current position PPi of movement to which the laser machining head is moved is measured, and stored in the memory 12 in association with the index i (step 205). Moreover, the position PPi of movement is displayed on the display of the teaching console 14 (step 206). Thereafter, the index i is incremented by 1 (step 207). The teaching program is checked to see if it is terminated (step 208). If the teaching program is not terminated, control is returned to step 203 and the aforesaid process is repeated. If the teaching program is terminated, the timer T is stopped (step 209). The process of measuring the position PP in a path commanded by the teaching program is thus terminated.

FIG. 6 is a flowchart describing a process of measuring an actual position of movement attained during actual machining so that the actual position of movement can be compared with a taught path position of movement and the difference between the actual position of movement and the taught path position of movement can be checked.

The processor 11 invokes a teaching program to be run (step 300), and resets the index i, which indicates acquired data of a path position of movement, to zero (step 301). Moreover, the processor 11 implements the copying control technique according to the invoked teaching program, and starts the timer T to count down a set time interval (step 302). The processor 11 performs interpolation to work out a position of movement commanded by the teaching program. Based on the distance between a workpiece and the laser machining head detected by the distance sensor 5, the processor 11 implements the copying control technique as a feedback control technique so that the distance will agree with a predetermined distance, and thus drives and controls the robot mechanism 1*a*.

Moreover, the timer T is checked to see if it has finished counting down the set time, that is, the set time is up (step 303). If the set time is up, the timer T is restarted to count down the set time (step 304). An actual position PQi of movement to which the laser machining head is moved currently is measured and stored in association with an index i in the memory 12 (step 305). As the laser machining head is moved by implementing the copying control technique, the actual position PQi of the laser machining head may be different from a path position PPi commanded by a teaching program. The position PPi in the path commanded by the teaching program which is stored in the memory 12 in association with the index i and acquired during the dry run is subtracted from the measured actual position PQi. Thus, the difference $\Delta Pi = PQi - PPi$ is calculated and stored (step 306).

The position PPi in the path commanded by the teaching program which is stored in the memory 12 in association with the index i is displayed on the display of the teaching console 14. Moreover, the actual position PQi of movement is displayed on the display of the teaching console 14 (step 307). Even in the display, similarly to the one performed in the first embodiment, the actual position PQi of movement and the position PPi in the path commanded by the teaching program are displayed with different display attributes such as in different display colors so that they can be distinguished from each other. Thereafter, the index i is increased by 1 (step 308). The teaching program is then checked to see if it is terminated (step 309). If the teaching program is not terminated, control is returned to step 303 and the foregoing process is repeated. If the program is terminated, the timer T is stopped (step 310), and then, the process is completed.

Figure 7:
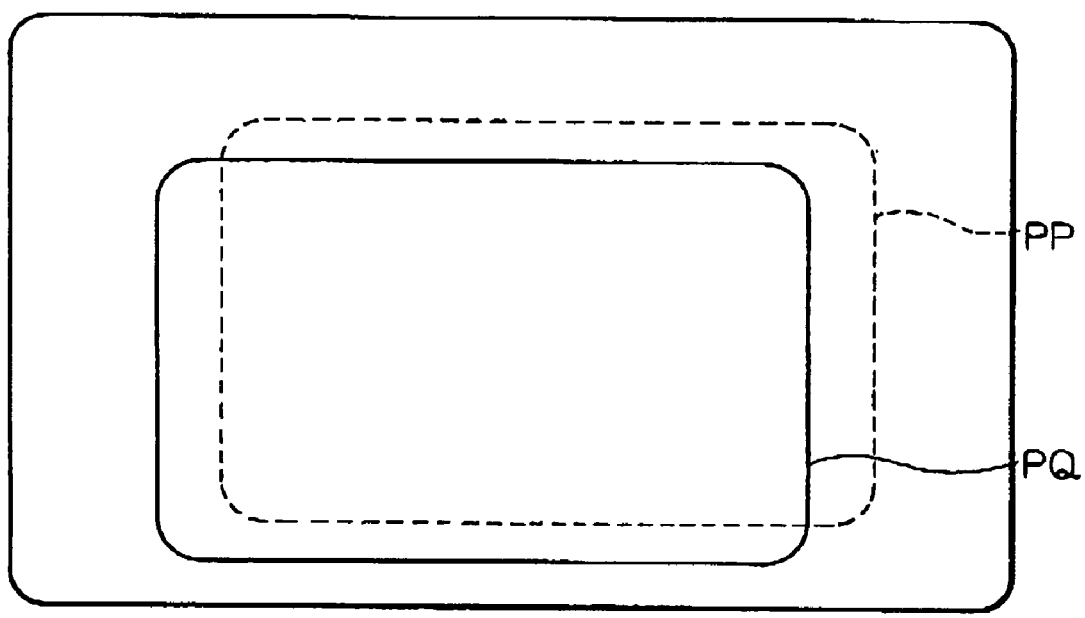
FIG. 7 shows an example of display on a display of a teaching console included in the second embodiment.

Consequently, on the display of the teaching console 14, the path commanded as the positions PP by the teaching program and the path of the actual positions PQ are displayed as shown in FIG. 7. Moreover, when an actual position PQi of movement or a position PPi in the path commanded by the teaching program is designated with a cursor or the like, the difference $\Delta Pi$ between the actual position PQi of movement and the position PPi (positions associated with the index i), $\Delta Pi = PQi - PPi$, is read from the memory 12 and indicated in the form of a numerical value. This makes it possible to check a displacement or a deformation of the workpiece 10 or a jig. Moreover, if a machining defect occurs, the machining defect is checked to see if it is a problem attributable to the distance sensor 5 or a problem attributable to the workpiece 10 or jig. Thus, the cause of the machining defect is readily revealed.

Moreover, an actual position PQi of movement, a position PPi in a path commanded by a teaching program, and the difference $\Delta Pi$ between the actual position PQi and position PPi may be displayed on an external display device other than the teaching console. For example, a personal computer may be connected to the robot control equipment 1*b* in order to transmit the actual position PQi of movement, the position PPi in the path commanded by the teaching program, and the difference $\Delta Pi$ to the personal computer. Consequently, the path of the actual positions PQ of movement and the path commanded as the positions PP by the teaching program may be displayed on the display screen of the personal computer.

Figure 8:
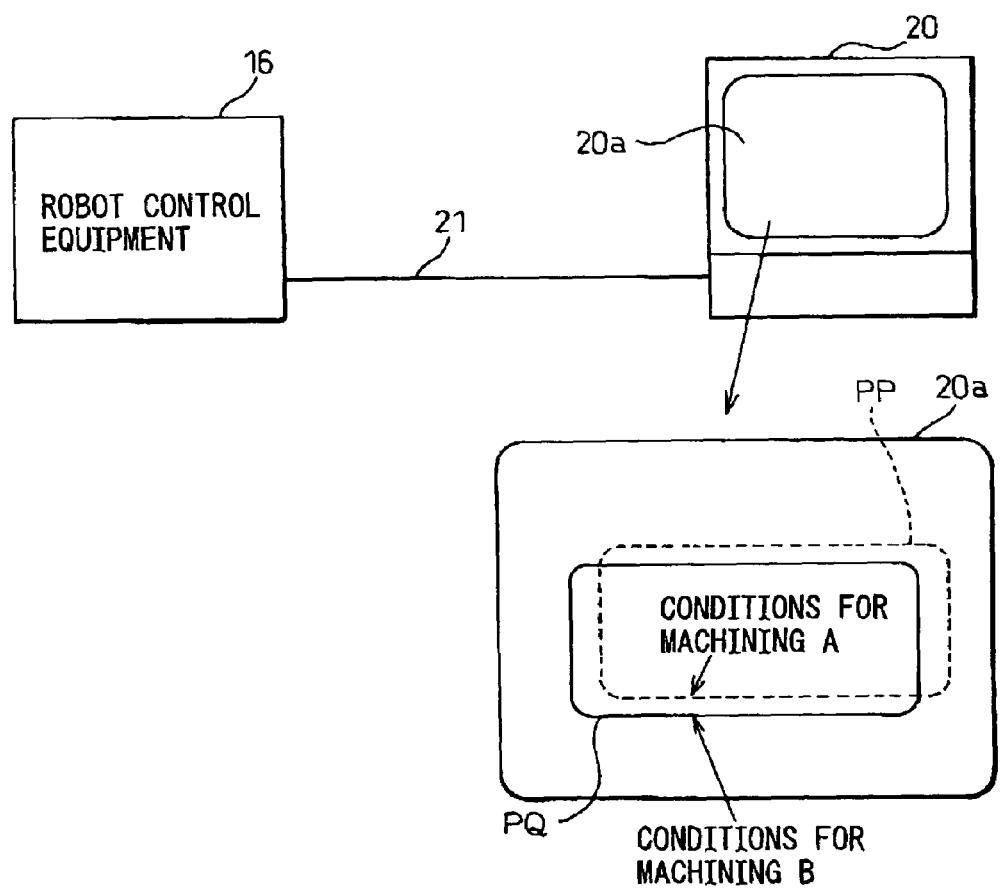
FIG. 8 schematically shows another system to which the correction data checking system in accordance with the present invention can be adapted.

FIG. 8 schematically shows another system to which the correction data checking system in accordance with the present invention can be adapted. The system employs a simulator. In a case shown in FIG. 8, a simulator 20 realized with a personal computer or the like is employed and connected to the robot control equipment 1*b* over a communication line 21, whereby the correction data checking system is constructed. The processor included in the robot control system 1*b* executes the same process as the one described in FIG. 6. Data acquisition in the dry run mode described in FIG. 5 is not carried out and, therefore, the process described in FIG. 6 includes neither the step 306 of calculating a difference $\Delta P$ nor the step 307 of displaying an actual position PQi and a taught point PPi. Namely, the actual position PQi of the laser machining head is merely measured and stored at intervals of a set time during actual machining. The thus stored actual positions PQi are transmitted to the simulator 20 over the communication line 21.

The simulator 20, realized with a personal computer or the like, acts as a calculation unit for calculating a path position of movement and an actual position of movement. The simulator 20 simulates a teaching program so as to display a path programmed as positions PP of movement, to which the laser machining head is moved, on a screen 20*a* serving as a comparison display unit. Moreover, the path of the actual positions PQ of the laser machining head sent from the robot control system 1*b* is displayed on the screen 20*a*. As shown in FIG. 8, the actual positions PQ and the path positions PP commanded by the teaching program are displayed on the display screen 20*a* of the simulator 20. Owing to the contents of the display, a displacement or a deformation of the workpiece 10 can be checked. If a machining defect occurs, the machining defect can be checked to see if it attributes to the distance sensor 5 or to the workpiece 10 or a jig. Thus, the cause of the machining defect can be readily revealed.

The embodiments have been described on the assumption that the distance sensor 5 is adopted as a sensor. Alternatively, the embodiments may be adapted to a case where: a laser sensor for detecting a position in a three-dimensional space is adopted as the sensor in order to detect a work line; and the copying control technique is implemented. In the case where the sensor for detecting the work line is adopted and the copying control technique is implemented, the conditions for specific machining may be modified depending on the shape of the workpiece 10 detected by the sensor. The present invention can be adapted to this case. Moreover, if the conditions for machining are displayed, a machined state may be monitored.

Figure 9:
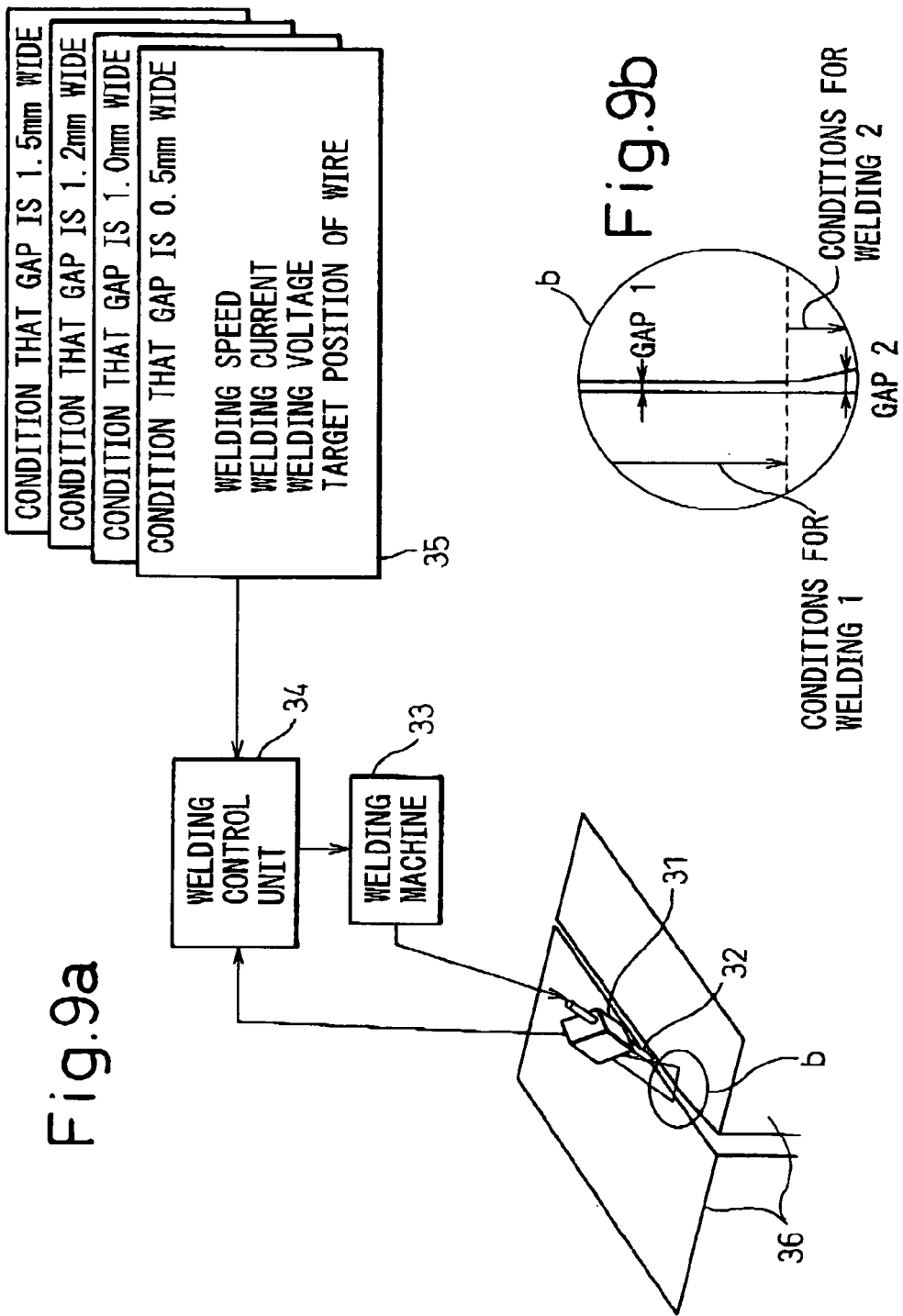

FIG. 9*a* shows a case where the present invention is applied, that is, FIG. 9*a* is an explanatory diagram showing a welding robot that uses a laser sensor 31 to perform arc welding by varying the conditions for arc welding along with a change in the shape of an object of work (in the shape of a joint) that is a workpiece 36, that is, a change in a work line. FIG. 9*b* is an enlarged view of a portion b in FIG. 9*a*. The laser sensor 31 for detecting a weld line that is a work line is attached together with an arc welding torch 32 to the distal end of a robot arm (the robot is not shown in FIG. 9*a*). The copying control technique is implemented as a robot feedback control technique on the basis of a position of movement commanded by a teaching program and a feedback value of a position on the weld line detected by the laser sensor so that the arc welding torch 32 will be moved along the weld line. Thus, the joint is welded. At this time, the conditions for welding including a welding speed, a welding current, a welding voltage, and a target position of a wire are varied depending on a gap included in the joint. Thus, the conditions for welding are optimized. The laser sensor 31 detects the size of the gap included in the joint. A weld control unit 34 reads the conditions for welding associated with the detected gap from a memory 35 included in robot control equipment, and controls a welding machine 33 under the conditions for welding. Thus, welding work is achieved.

According to the present invention, if the conditions for machining (welding) are varied depending on the state of a workpiece detected by the sensor, an actual position of movement PQ and the conditions for machining (welding) designated at the position are detected, and both the conditions for machining commanded by the teaching program and the actual conditions for machining are displayed. FIG. 8 shows a case where the conditions for machining commanded by the teaching program are conditions A and the actual conditions for machining are conditions B.

As mentioned above, as both the taught conditions for machining and the actual conditions for machining are displayed in comparison with each other, a machined state can be detected accurately. A displacement or deformation of a workpiece can be grasped reliably.

Figure 10:
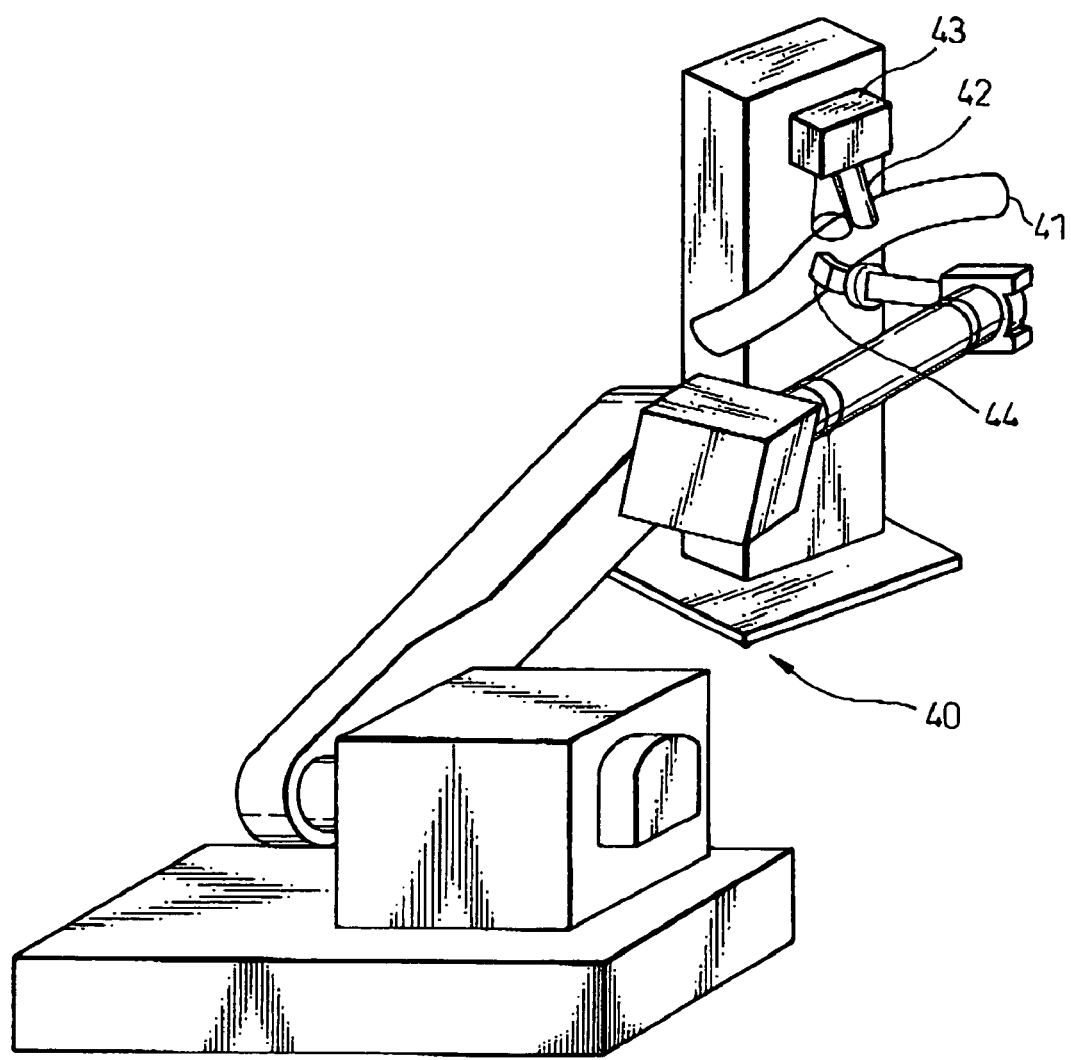
FIG. 10 schematically shows still another system to which the correction data checking system in accordance with the present invention can be adapted.

The foregoing embodiments are concerned with a case where a working tool and a sensor are attached to the distal end of a robot arm, and a workpiece is fixed and then machined or worked. In contrast, as shown in FIG. 10, a machining tool 42 and a sensor 43 such as a distance sensor or a laser sensor for detecting a work line may be held stationary. In this case, a hand 44 attached to the distal end of an arm of a robot 40 holds a workpiece 41. The sensor 43 detects the relative positions of the working tool 42 and workpiece 41. The copying control technique is implemented in the robot 40 on the basis of the position of the workpiece commanded by a teaching program and the position thereof detected by the sensor. Thus, machining or work may be achieved.

As described so far, when a robot is actually working on an object of work, taught data and actual data can be checked in comparison with each other. If a machining defect occurs, the machining defect is checked to see if it is a problem attributable to a sensor or a problem attributable to a workpiece or a jig. The cause of the machining defect is thus revealed. Consequently, the cause of a defect can be quickly revealed and dealt with at a working site.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A correction data checking system for robots including a sensor for detecting the position of a work line on a workpiece or a sensor for measuring the distance to the workpiece, and a working tool being moved relative to the workpiece according to a copying control technique, the correction data checking system for robots comprising:
   a path position-of-movement calculation unit that checks a path position of movement commanded by a teaching program;
   an actual position-of-movement calculation unit that calculates an actual position of movement, to which the working tool is moved by implementing the copying control technique, according to the teaching program; and
   a comparison display unit that displays the actual position of movement and the associated path position of movement in comparison with each other.

2. The correction data checking system for robots as set forth in claim 1, wherein the path position of movement and the actual position of movement are calculated for each position taught by the teaching program.

3. The correction data checking system for robots as set forth in claim 1, wherein the system further comprises a memory unit in which the path positions of movement calculated at a plurality of predetermined timings are stored, and the comparison display unit displays the actual: positions of movement and the path positions of movement which are stored in the memory unit in association with the actual position of movement, in comparison with each other.

4. The correction data checking system for robots as set forth in claim 1, wherein the system further comprises a device for externally indicating the actual position of movement and the path position of movement.

5. The correction data checking system for robots as set forth in claim 1, wherein the working tool is held stationary and the workpiece is moved according to the copying control technique by employing a sensor that detects the position of a work line on the workpiece or a sensor that measures the distance to the workpiece.

6. A correction data checking system for robots including a sensor for detecting the position of a work line on a workpiece or a sensor for measuring the distance to the workpiece, and a working tool relatively moved to the workpiece according to a copying control technique, the correction data checking system for robots comprising:
   a path position-of-movement calculation unit that checks a path position of movement by simulating a teaching program;
   an actual position-of-movement calculation unit that calculates an actual position of movement, to which the working tool is moved by implementing the copying control technique, according to the teaching program; and
   a comparison display unit that displays the simulated path position of movement and the actual position of movement in comparison with each other.

7. The correction data checking system for robots as set forth in claim 6, wherein the working tool is held stationary and the workpiece is moved according to the copying control technique by employing a sensor that detects the position of a work line on the workpiece or a sensor that measures the distance to the workpiece.

* * * * *